United States Patent
Tahara et al.

(10) Patent No.: US 6,362,842 B1
(45) Date of Patent: Mar. 26, 2002

(54) OPERATION PICTURE DISPLAYING APPARATUS AND METHOD THEREFOR

(75) Inventors: Yoshinori Tahara, Yamato; Daisuke Tomoda, Yokohama; Norikazu Ichikawa, Yamato; Yohichiroh Matsuyama, Kawasaki, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,808

(22) Filed: Jan. 28, 1999

(30) Foreign Application Priority Data

Jan. 29, 1998 (JP) .......................................... 10-016821

(51) Int. Cl.7 ................................................ G06F 3/14
(52) U.S. Cl. ....................... 345/856; 345/711; 345/764; 345/705; 345/857
(58) Field of Search ................................ 345/339, 159, 345/163, 336, 145, 157, 358, 348, 352, 354

(56) References Cited

U.S. PATENT DOCUMENTS 4,987,411 A * 1/1991 Ishigami ..................... 345/159
5,287,448 A * 2/1994 Nicol ......................... 345/337
5,754,176 A * 5/1998 Crawford ................... 345/338
5,764,219 A * 6/1998 Rutledge .................... 345/159

* cited by examiner

Primary Examiner—Raymond J. Bayerl
Assistant Examiner—Thomas T. Nguyen
(74) Attorney, Agent, or Firm—Ronald L. Drumheller

(57) ABSTRACT

An icon/window which a user is selecting is precisely predicted to improve the operability of a GUI. This invention displays a GUI picture, including an icon/window and a pointer of a mouse or the like in a display screen of a computer, predicts an icon which the user is selecting based on the moving speed and the direction of movement of the pointer, and displays a tool tip or the like which indicate the function of the icon. This invention also predicts an operation which the user is effecting on the window based on the moving speed of the pointer and a distance between the pointer and a window, changes the display of the pointer from a conventional arrow head during the movement to a bidirectional arrow head appearing in changing the size of the window, for example, depending on the prediction, and further assists an operation to change the size of the window in response to clicking by the user.

19 Claims, 11 Drawing Sheets

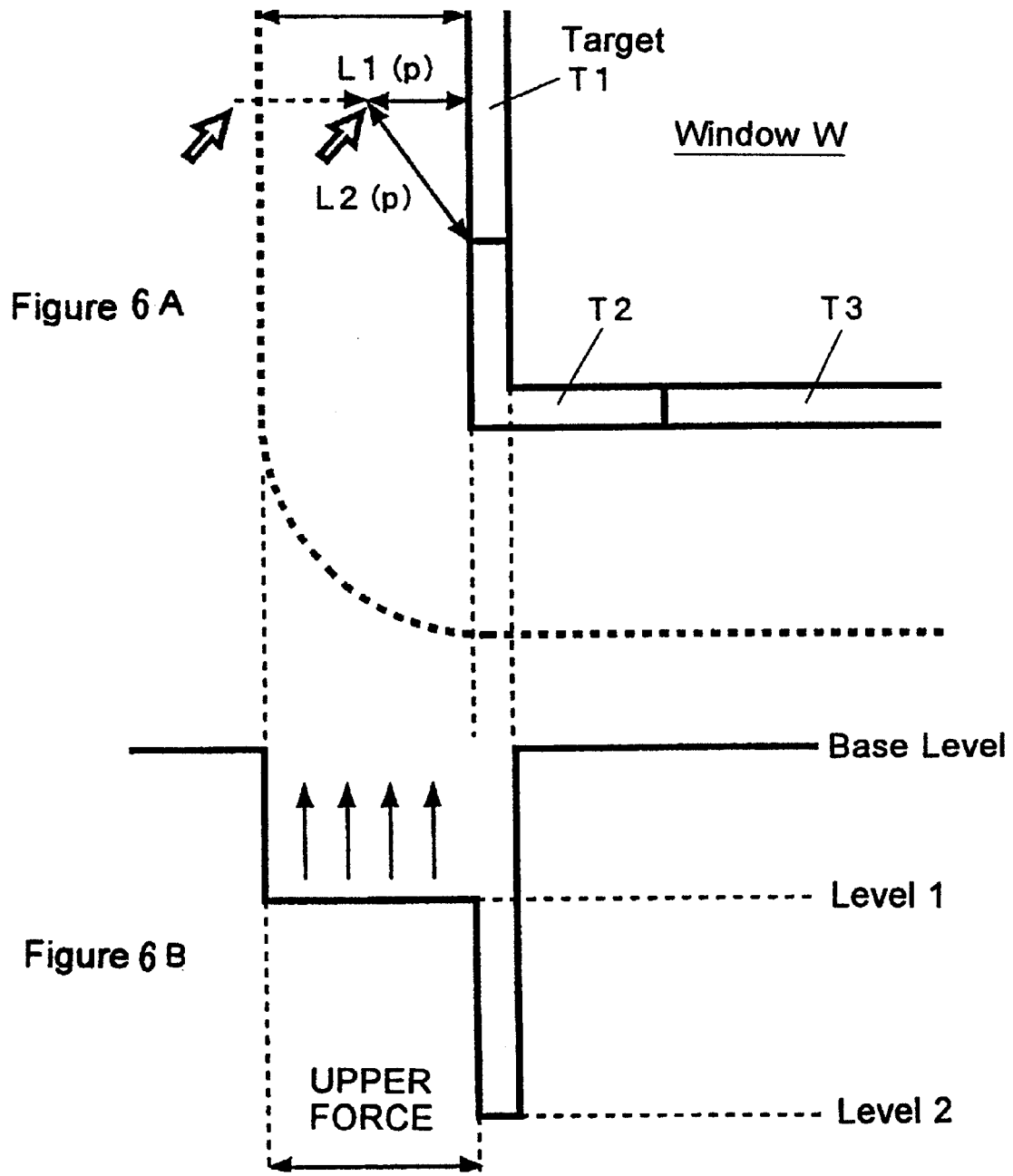

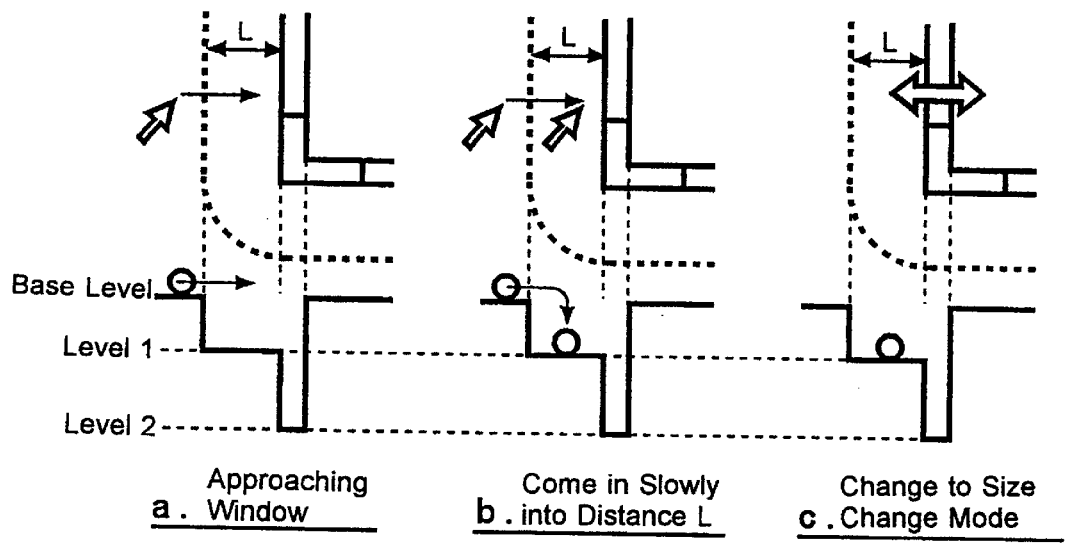
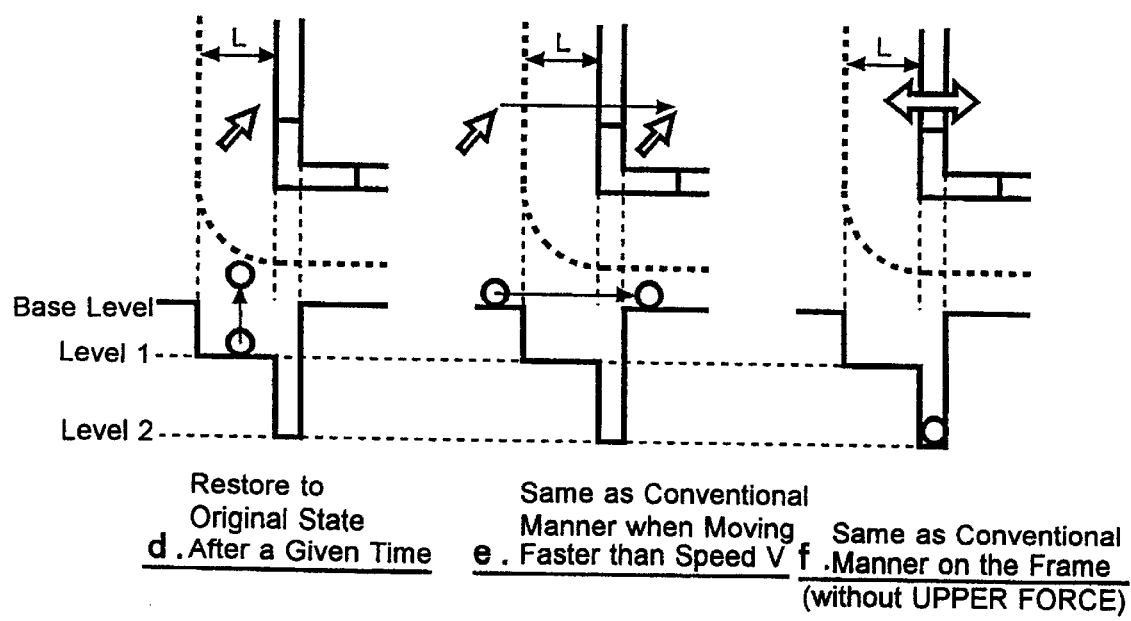
Figure 7

OPERATION PICTURE DISPLAYING APPARATUS AND METHOD THEREFOR

BACKGROUND OF THE INVENTION

1. Field of the Invention

This invention relates to an operation picture displaying apparatus and method thereof for displaying a GUI (graphical user interface) picture which receives an operation to a computer in response to pointing by a pointing device such as a mouse with an improved operability.

2. Related Art

A GUI which displays an operation picture (icon) on the display screen of a monitor device, moves a pointer to a target icon to select it using a pointing device such as a mouse for allowing a user to input an operation correlated to the icon to a computer has been widely used.

For example, PUPA 5-73257 and PUPA 5-298023 (references 1, 2) disclose a GUI of improved operability by changing the color and shape of an icon depending on the moving speed of a cursor and selecting an icon depending on the direction of movement of a pointer and the distance from the icon.

However, with the method disclosed in the reference 1, a picture which is required for an operation is hidden by an icon which is enlarged. Even if only the color and the shape are changed without changing the size of the icon in this method, the difficulty involved when a precise manipulation such as precisely moving the pointer to a frame portion of the icon (window) is required is not different from a case where this method is not used.

The method disclosed in the reference 2 can not be applied to a case where it is desired to select a portion of an icon such as the frame of the icon (window).

A device to improve the operability of GUI includes displaying a function of an icon to which the mouse has moved in a picture called "tool tip" which looks like a balloon.

Because the tool tip is not displayed until the pointer moves to the icon, if the pointer is moved to a wrong icon despite the user wants to know the function of an aimed icon, the mouse operation required for moving the mouse is totally useless.

SUMMARY OF THE INVENTION

This invention is conceived in view of the above described problems of the prior art and aims at providing an operation picture displaying apparatus and a method thereof which makes the operation in doing a precise work such as pointing the frame of an icon (window) easy without sacrificing other operability to improve the operability of GUI.

It is also an object of this invention to provide an operation picture displaying apparatus and a method thereof which precisely predicts an icon (window) to be selected by a user in response to the operation of a pointing device to improve the operability of GUI.

It is another object of this invention to provide an operation picture displaying apparatus and a method thereof which precisely predicts an icon (window) to be selected by a user to improve the operability of GUI so as allow an operation to be effected to a part of an area of the icon (window) according to the prediction.

It is another object of this invention to provide an operation picture displaying apparatus and a method thereof which precisely predicts an icon (window) to be selected by a user to assist users operation by correctly displaying the function of the icon (window) according to the prediction.

First Picture Displaying Device

In order to achieve the above objectives, this invention provides a first operation picture displaying apparatus comprising: operation picture displaying means for displaying one or more operation pictures each of which is correlated to an operation to a computer in a display screen, pointer picture displaying means for displaying a pointer at a pointed position in said display screen in response to an external operation pointing an arbitrary position in said display screen, moving direction/speed detecting means for detecting the direction and the speed of movement of said pointer in said display screen, and operation picture selecting means for selecting either one of said operation pictures displayed in said display screen based on said detected moving direction and moving speed.

Preferably, said picture selecting means selects only said operation picture displayed in the direction of movement of said pointer when the moving speed of said pointer exceeds a predetermined threshold speed.

Preferably, said picture selecting means cancels the selection of said selected operation picture when the duration in which the moving speed of said pointer is below the predetermined threshold speed lasts longer than a predetermined threshold time.

Preferably, operation content displaying means is further provided to display the content of said operation correlated to said selected operation picture in said display screen.

Operation of the First Picture Displaying Device

The first picture displaying device of this invention displays an operation picture for GUI (GUI picture, icon/window and the like) correlated to a computer operation such as a file operation and starting a software, and a pointer indicating (pointing) the position in the display screen pointed by a pointing device such as a mouse in a display screen.

The first picture displaying device predicts and selects an icon to be selected by a user based on the speed and the direction of movement of the pointer and displays a picture (tool tip and the like) explaining a function correlated to the selected icon in association with the icon and the like Operation Picture Displaying Apparatus The operation picture displaying apparatus displays a GUI picture, i.e., a picture such as an icon and a window which is correlated to an operation to a computer in the display screen of a display device of the computer.

Pointer Displaying Means

The pointer displaying means displays a picture of a pointer such as a pointer of a mouse pointer at an arbitrary position on the display screen specified by an operation of a pointing device such as a mouse by a user.

Moving Direction/Speed Detecting Means

The moving direction/speed detecting means measures the display position of a pointer at a given time interval to detect to which direction and what distance (picture elements) the pointer moved (moving speed) in a given time.

Operation Picture Selecting Means

When the operation picture selecting means detects an event that the moving speed of the pointer exceeds a predetermined threshold speed, it determines that the user increases the moving speed of the pointer in an attempt to move the pointer to a target icon, predicts that an icon existing in the direction of the moment of the pointer (for example, within an angular range of +/−θ with respect to the direction of movement of the pointer) is an icon for which the user targets and selects it.

When the picture selecting means detects an event that duration in which the moving speed of the pointer is below a predetermined threshold speed lasts longer than a predetermined threshold time when the picture selecting means is selecting an icon by prediction, the picture selecting means determines that the user no longer targets the icon selected by the prediction and cancels selection of the icon which has been so far selected by the prediction.

The operation picture displaying apparatus displays a function correlated to an icon selected by the prediction in the form of a tool tip, for example, in association with the pointer or the icon to assist the user to select the icon.

When the moving speed of the pointer decreases for a period longer than a given time and the selection by the prediction is cancelled, the operation picture displaying apparatus erases the display of the tool tip and the like Second Picture Displaying Apparatus The second operation picture displaying apparatus of this invention comprises; operation picture displaying means for displaying one or more operation pictures each of which is correlated to an operation to a computer in a display screen, pointer picture displaying means for displaying a pointer at a pointed position in said display screen in response to an external operation pointing an arbitrary position in said display screen, moving speed/distance detecting means for detecting the speed of movement of said pointer in said display screen and the distance (pointer distance) between said pointer and each of said operation pictures displayed in said display screen, and operation picture selecting means for selecting either one of said operation pictures displayed in said display screen based on said detected moving speed and said pointer distance.

Preferably, said operation picture selecting means selects one of said operation pictures which is within a predetermined distance range from said pointer only when said detected pointer distance is within said predetermined distance range and said detected moving speed is within a predetermined speed range.

Preferably, said operation picture selecting means cancels selection of said selected operation picture when said detected pointer distance is within said predetermined distance range and said detected moving speed exceeds an upper limit of said predetermined speed range or is blow a lower limit of said predetermined speed range for longer than a predetermined threshold time, or when said detected pointer distance is outside said predetermined distance range.

Preferably, pointer picture modifying means is further provided for modifying the picture of said displayed pointer in response to said operation correlated to said selected operation picture.

Preferably, operation input means is further provided for inputting said operation correlated to said selected operation picture to said computer in response to operation from the exterior.

Operation of the Second Operation Picture Displaying Apparatus

The second operation picture displaying apparatus of this invention displays an operation picture for GUI (GUI picture; icon/window and the like) which is correlated to a file operation and starting a software, and a pointer indicating (pointing) the position in the display screen pointed by a pointing device such as a mouse in the display screen.

The second operation picture displaying apparatus also predicts an operation which the user is effecting based on the moving speed of the pointer and the distance from the icon and changes the display of the pointer and the like depending on the prediction.

The second operation picture displaying apparatus further assists the user to select an icon, a window or a portion thereof (peripheral frame of the window) in response to operation (clicking a mouse button and the like) by the user after the display of the pointer has been changed.

Moving Speed/Distance Detecting Means

The moving speed/distance detecting means detects the moving speed v of the pointer in the manner similar to the moving direction/speed detecting means of the first operation picture displaying apparatus and detects how many picture elements (distance) the pointer is apart from the periphery of each icon.

Operation Picture Selecting Means

When the pointer is within a predetermined distance from a certain window and the moving speed v is within a predetermined speed range (0<v<V; V is the upper limit of the speed range), the operation picture selecting means determines that the user is moving the pointer toward the window in an attempt to select it and lowering the moving speed to try to precisely place the pointer on the window, and predicts that the user is aiming at this window and selects it.

The operation picture selecting means may select by a prediction only a component of the window such as the frame thereof and the like which the user drags when the user changes the size of the window rather than necessarily selecting the whole window.

When the moving speed exceeds the upper limit value V even though the distance between the pointer and the window is within said predetermined range, and when the user stops moving the pointer (v=0), the operation picture selecting means determines that the user does not aim at this window and decides not to select the window by the prediction.

When the frame of the window is selected by the prediction, for example, the pointer picture modifying means changes the shape of the pointer from a unidirectional arrow head oriented to the direction of movement to a bidirectional arrow head which usually appears in changing the size of the window.

When the user effects clicking of a mouse button and the like while the pointer is in a state in which it is a bidirectional arrow head as described in the above, the operation input changes the size of the picture of the window.

Operation Picture Displaying Method

This invention provides an operation picture displaying method comprising the steps of; displaying one or more operation pictures each of which is correlated to an operation to a computer in a display screen, displaying a pointer at a pointed position in said display screen in response to an external operation pointing an arbitrary position in said display screen, detecting the direction and the speed of movement of said pointer in said display screen or the speed of movement of said pointer in said display screen, and the distance (pointer distance) between said pointer and each of said operation pictures displayed in said display screen, and selecting either one of said operation pictures displayed in said display screen based on said detected moving direction and moving speed.

First Recording Medium

This invention provides a first computer readable recording medium storing a program which causes a computer to execute: an operation picture displaying step of displaying one or more operation pictures each of which is correlated to an operation to a computer in a display screen, a pointer picture displaying step of displaying a pointer at a pointed position in said display screen in response to an external operation pointing an arbitrary position in said display screen, a moving direction/speed detecting step of detecting the direction and the speed of movement of said pointer in said display screen, and an operation picture selecting step of selecting either one of said operation pictures displayed in said display screen based on said detected moving direction and moving speed.

Second Recording Medium

This invention provides a second computer readable recording medium storing a program which causes a computer to execute: an operation picture displaying step of displaying one or more operation pictures each of which is correlated to an operation to a computer in a display screen, a pointer picture displaying step of displaying a pointer at a pointed position in said display screen in response to an external operation pointing an arbitrary position in said display screen, a moving speed/distance detecting step of detecting the speed of movement of said pointer in said display screen and the distance (pointer distance) between said pointer and each of said operation pictures displayed in said display screen, and an operation picture selecting step for selecting either one of said operation pictures displayed in said display screen based on said detected moving direction and moving speed.

BRIEF DESCRIPTION OF THE DRAWINGS

FIG. 1A is a diagram showing a tool tip picture conventionally used in GUI (graphical user interface) while

FIG. 6 shows diagrams of the operation picture displaying method of the second embodiment of this invention. FIG. 6A is a diagram showing the frame of a window and the range of the distance L while FIG. 6B is a diagram showing the range of the distance L of the window and the state of the pointer picture control corresponded each other.

FIG. 7 is a diagram showing how the state of the level of the pointer varies depending on the distance from the frame of the window and the moving speed v of the pointer in the operation picture displaying method shown in FIG. 6.

DESCRIPTION OF THE PREFERRED EMBODIMENTS

First of all, the background of this invention is described to make the following description understandable more easily.

Figure 1A:
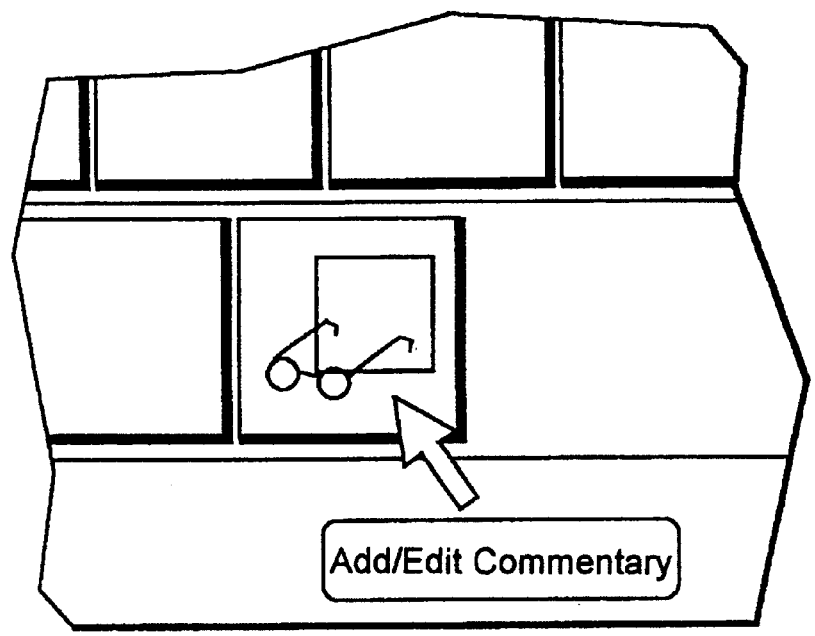
Figure 1B:
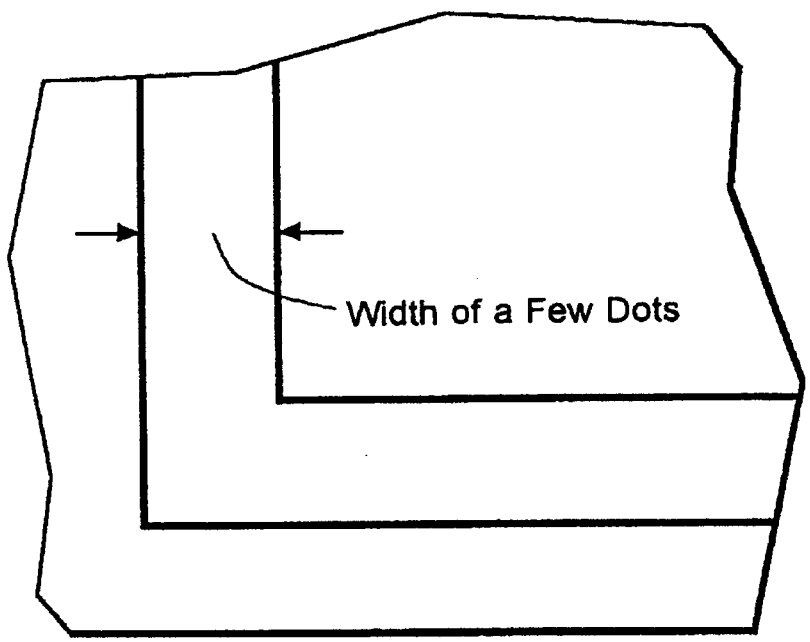
FIG. 1B is a diagram showing a frame of a window picture conventionally used in GUI.

FIG. 1A is a diagram showing a tool tip picture conventionally used in GUI (graphical user interface) while FIG. 1B is a diagram showing a frame of a window picture conventionally used in GUI.

For example, as shown in FIG. 1A, a tool tip is so devised as to be used to display the function of an icon and the like which a user pointed by a pointing device such as a mouse within a frame which looks like a balloon to assist the operation by the user.

However, the tool tip is not normally displayed until the pointer reaches the target icon despite the user wants to know the function of the target icon as early as possible. Therefore, the operation of moving the pointer would be totally useless if the icon toward which the user moved the pointer is not a target icon.

Accordingly, it is desirable that the icon to which the user is moving the pointer is predicted and the function thereof is displayed as early in the operation as possible.

Also, as shown in FIG. 1B for example, the width of the frame of the window which has to be pointed when the user changes the size of the window may be only a few dots in terms of the number of dots.

It is difficult to precisely move the pointer to such narrow range and the user is pressed by a burden.

It is therefore desirable when such precise operation is required for a user to predict whether the user is selecting the frame of a window or selecting other picture such as the body of the window for substantially expanding the area to which the pointer is moved in selecting the frame of the window.

This invention is conceived in order to improve the operability of GUI operation by a user in this way.

First Embodiment

An operation picture displaying method for predicting a target icon and/or window (icon/window) to which a user is moving the pointer to display the function thereof is now described hereunder as a first embodiment of this invention.

Computer 1

Figure 2:
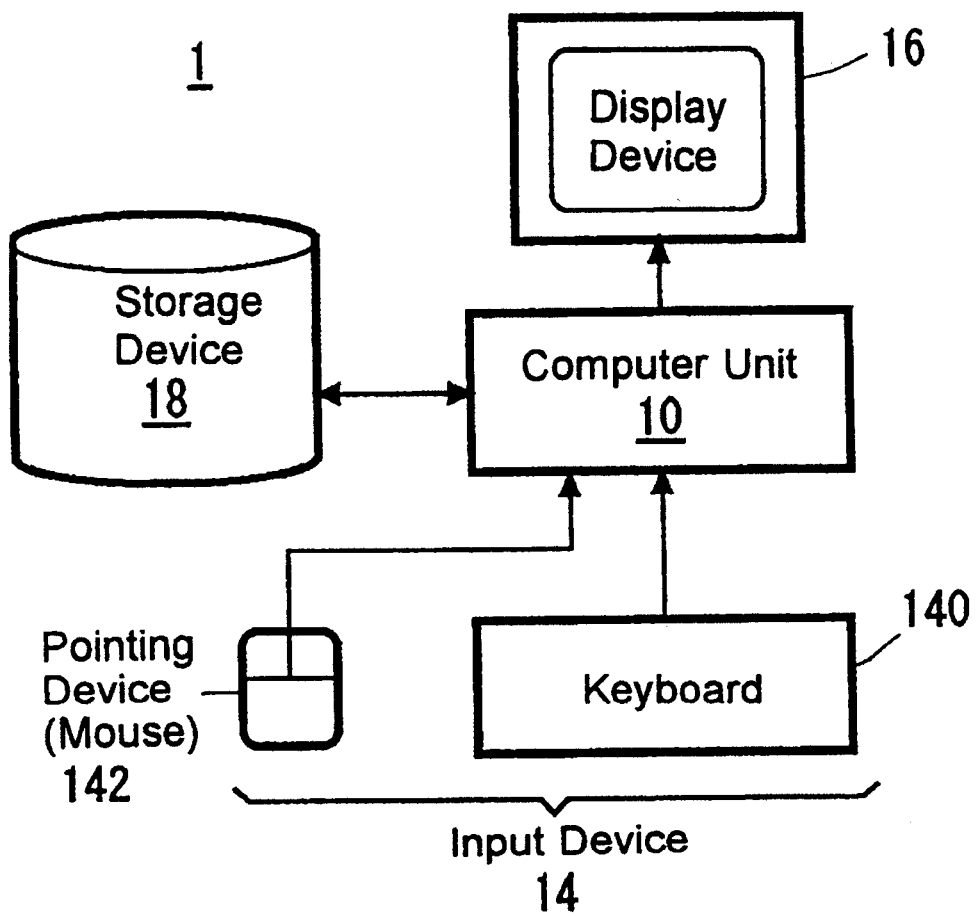
FIG. 2 is a diagram showing an example of the configuration of a computer 1 to which the operation picture displaying method of this invention is adapted.

FIG. 2 is a diagram showing an example of the configuration of a computer 1 to which the operation picture displaying method of this invention is adapted.

As shown in FIG. 2 as an example, the computer 1 comprises a computer unit 10 including a CPU, a memory and peripheral circuits (not shown), an input device 14 including a keyboard 140 and a pointing device 142 such as a mouse, a display device 16 such as a CRT display and a liquid crystal display and a storage device 18 such as a hard disk, and functions as a personal computer provided with GUI.

GUI Software 2

Figure 3:
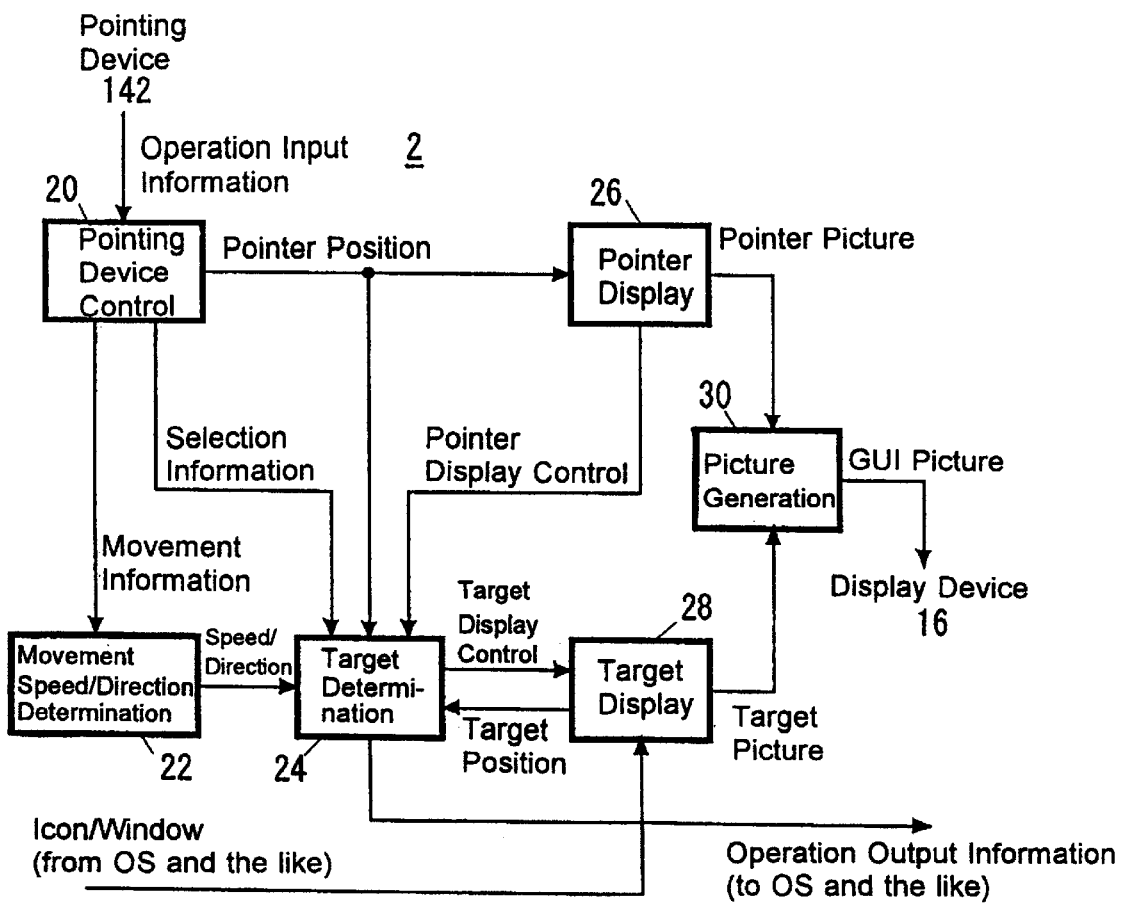
FIG. 3 is a diagram showing as an example the configuration of the GUI software 2 implementing the operation picture displaying method of this invention.

FIG. 3 is a diagram showing as an example the configuration of the GUI software 2 implementing the operation picture displaying method of this invention.

As shown in FIG. 3, the GUI software 2 comprises a pointing device control part 20, a moving speed/direction determination part 22, a target determination part 24, a pointer displaying part 26, a target displaying part 28 and a picture generation part 30

The GUI software 2 is stored in the storage device 18, read out therefrom, loaded in the memory of the computer unit 10, executed, predicts a target icon/window to which the user is moving the pointer, and displays functions thereof for implementing the above described functions.

Pointing Device Control Part 20

The pointing device control part 20 detects the operation which the user effected on the pointing device 142, i.e., detects to which direction and in what distance the user moved the pointer displayed in the display device 16 by operating the pointing device 142 (operation input information).

The pointing device control part 20 also sequentially generates pointer position information which indicates in which position on the display screen of the display device 16 the pointer is to be displayed as a result of operation on the pointing device 142 by the user based on the position of the pointer before it is moved by the user and operation input information, and outputs it to the target determination part 24 and the pointer displaying part 26.

The pointing device control part 20 also detects a selection operation which the user effected on the pointing device 142, for example depression by the user of the right or left button of a mouse when the pointing device 142 is a mouse, and outputs it to the target determination part 24 as selection information.

The pointing device control part 20 also outputs the detected operation input information to the moving speed/direction determination part 22 as movement information indicating the movement of the pointer.

Moving Speed/Direction Determination Part 22

The moving speed/direction determination part 22 samples movement information inputted from the pointing device control part 20 at intervals of a given time (0.1 second, for example) and generates speed/direction data indicating to which direction and by how many picture elements (distance) the pointer has moved for the given time (moving speed v) on the display screen of the display device 16 for output to the target determination part 24.

Target Determination Part 24

The target determination part 24 determines how many picture elements the pointer is apart from each of icons/windows (pointer distance) based on the target position information inputted from the target displaying part 28 and the pointer position information inputted from the pointing device control part 20.

Further, the target determination part 24 predicts to which icon/window or a component thereof such as a frame (target) the user is moving the pointer based on the determined pointer distance and the speed/direction information inputted from the moving speed/direction determination part 22, generates target displaying control information and/or pointer displaying control information depending on the predicted target, and output it to the target displaying part 28 and the pointer displaying part 26.

The target determination part 24 also selects a predicted target or a target to which the user has actually moved the pointer in response to the selection operation effected by the user on the pointing device 142, generates operation information indicating the selected target, and outputs it to the operating system (OS; not shown) of the computer unit 10.

Pointer Displaying Part 26

The pointer displaying part 26 outputs to the picture generating part 30 pointer picture information which gives a picture of the pointer (the picture of the arrow head shown in FIG. 1A, for example) at a position in the display screen of the display device 16 which is indicated by the pointer position information inputted from the pointing device control part 20.

The pointer displaying part 26 also modifies the pointer picture information so as to display the picture of the pointer with its content modified (for example, the picture of the unidirectional arrow head in selecting an icon/window is modified to the bidirectional arrow head in changing the size of the window) based on the pointer display control information inputted from the target determination part 24, and outputs it to the picture generating part 30.

Target Displaying Part 28

The target displaying part 28 displays icons/windows in respective positions based on icon/window information which is inputted from the OS and the like of the computer unit 10 and indicates pictures of respective icons/windows and display positions of pictures of respective icons/windows in the display screen of the display device 16.

The target displaying part 28 generates target position information indicating the display position (the range of display of icon/window) of the icon/window in the display screen of the display device 16 which is given by the icon/window information and outputs it to the target determination part 24.

The target displaying part 28 also modifies the target picture information so as to display the picture of the predicted target or the target to which the user has actually moved the pointer with its content modified (for example, change the color of the predicted or selected icon) based on the target display control information inputted from the target determination part 24 and outputs it to the picture generating part 30.

Picture Generating Part 30

The picture generating part 30 generates a picture (GUI picture) used for GUI operation by superimposing the pointer picture information inputted from the pointer displaying part 26, the target picture information inputted from the target displaying part 28 and a wall paper picture supplied from the OS and the like to display it in the display screen of the display device 16 for presentation to the user.

Operation of Computer 1 (GUI Software 2) in the First Embodiment

The operation of the computer 1 (GUI software 2) in the first embodiment is described hereunder.

Figure 4:
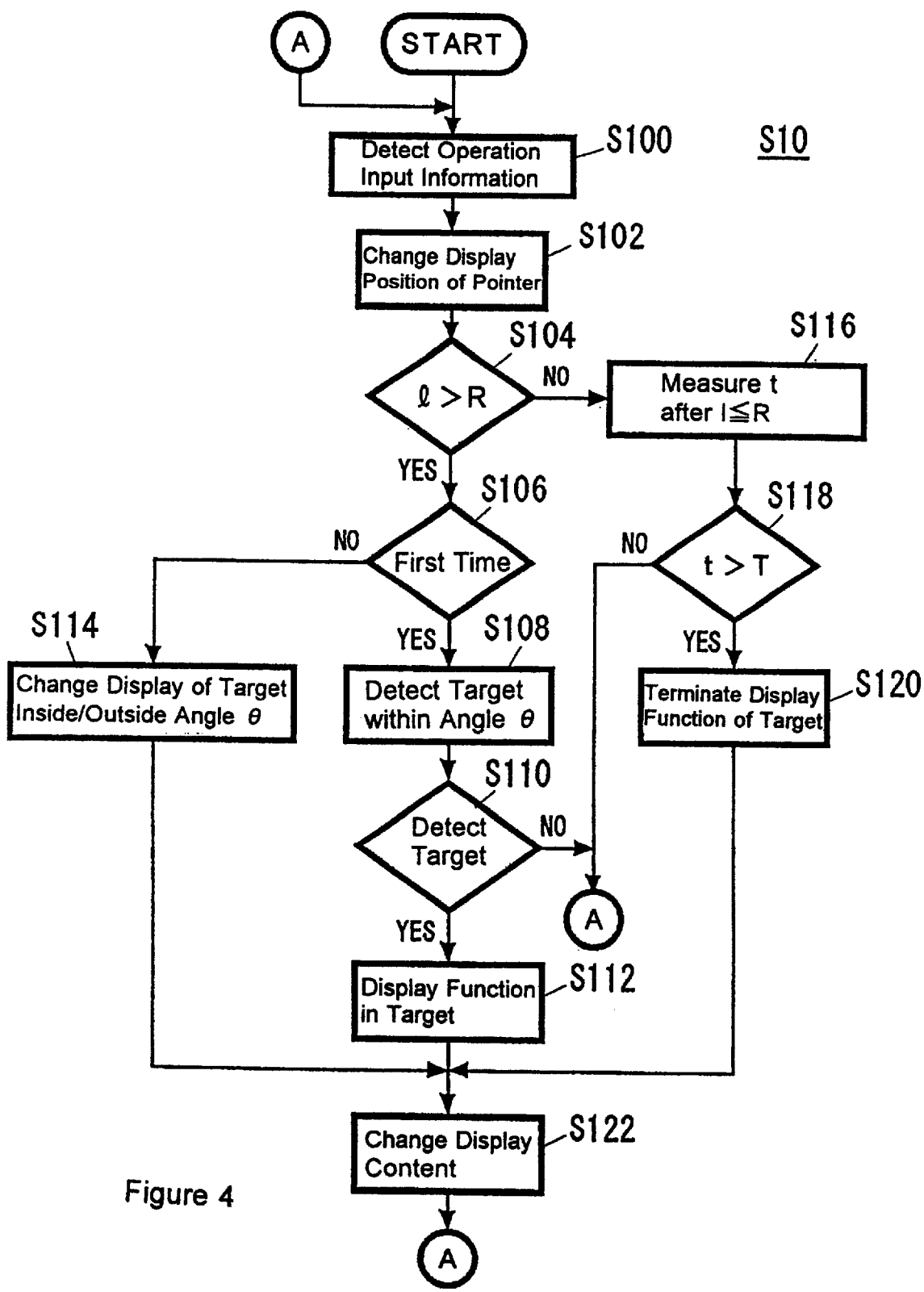
FIG. 4 is a flow chart showing the operation (S10) of the computer 1 (GUI software 2) in the first embodiment.

FIG. 4 is a flow chart showing the operation (S10) of the computer 1 (GUI software 2) in the first embodiment.

Figure 5:
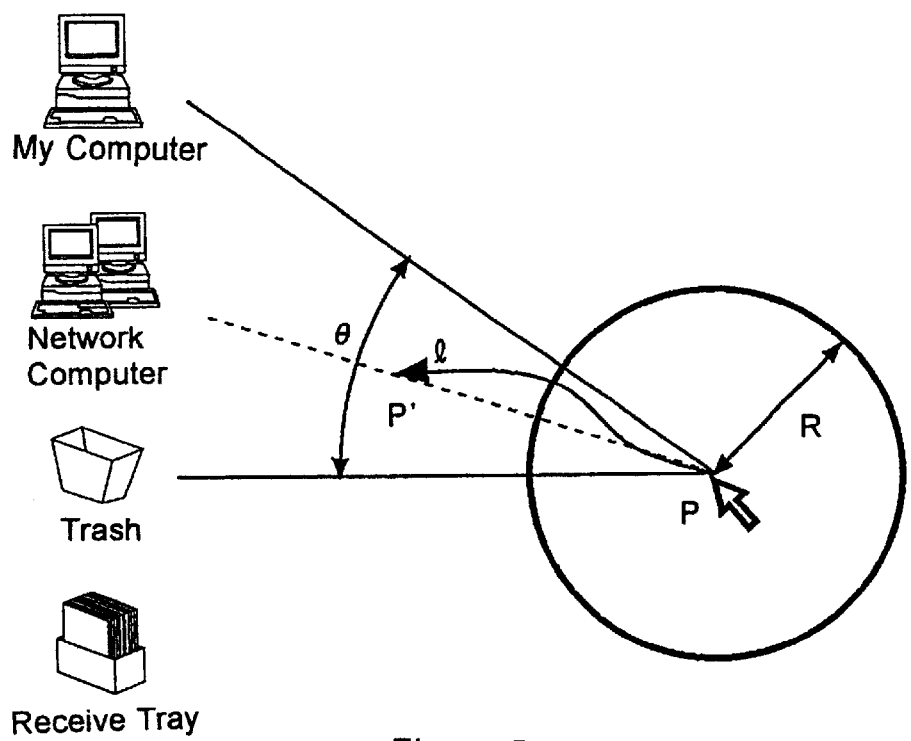
FIG. 5 is a diagram showing a method of detecting a target depending on the direction of movement of the pointer.

FIG. 5 is a diagram showing a method of detecting a target depending on the direction of movement of the pointer.

As shown in FIG. 4, in step 100 (S100), the pointing device control part 20 detects operation input information in response to the operation effected by the user on the pointing device 142, generates pointed position information indicating the display position of the pointer based on the detected operation input information to output it to the target determination part 24 and the pointer displaying part 26, and further generates speed/direction information indicating the moving speed v and the direction of movement of the pointer for output to the target determination part 24.

In step 102 (S102), the pointer displaying part 26 changes the position of the pointer picture in the display screen of the display device 16 to a position indicated by the pointer position information inputted from the pointing device control part 20 for display.

In step 104 (S104), the target determination part 24 determines whether or not the distance l of movement of the pointer during a given time (time period k) is longer than a predetermined distance threshold value R, i.e., the moving speed v during the period k exceeds a given threshold value. The target determination part 24 proceeds to the process of S106 if the moving speed v exceeds the threshold value while it proceeds to the process of S116 otherwise.

$R=(X^2+y^2)$, for example, where x and y means that the pointer moves over x picture elements horizontally and y picture elements vertically in the screen during a given time. Specifically, R=300 picture elements but this depend on the resolution of the display device and may be adjusted by the user.

In step 106 (S106), the target determination part 24 determines whether or not the distance of movement of the pointer 1 is no greater than the distance threshold R, i.e., the moving speed v does not exceeds a given threshold during the period (k–1) until it exceeds the given threshold in the period k and proceeds to the process of S108 if it first exceeds the threshold. Otherwise, the target determination part 24 proceeds to the process of S 114.

In step 108 (S108), the target determination part 24 detects a target which is displayed in the range of angle θ opening toward the direction of movement of the pointer in the display screen of the display device 16. When multiple targets satisfying this condition exist, the target determination part 24 detects a target which is nearest the center of the direction of movement of the pointer, for example.

In step 110 (S110), the target determination part 24 determines whether or not a target is detected in the process of S108. The target determination part 24 proceeds to the process of S112 when the target is detected while it proceeds to the process of S100 otherwise.

In step 112 (S112), the target determination part 24 predicts that the user is moving the pointer fast in an attempt to move it to the target which is detected in the process of S108 when it is determined to be true in the determination of S104, S106 and S100, generates a target display control signal of a content which causes the target detected in the process of S108, for example, to be displayed in proximity of the detected target with a function specified when the user clicks the right button associated, and outputs it to the target displaying part 28.

In step 114 (S114), the target determination part 24 detects a target which first comes in the range of angle θ in the direction of movement of the pointer in the period k, and generates a target display control signal which terminates the function display shown in S112 with respect to a target which goes out of the range of angle θ in the direction of movement of the pointer in the period k despite it was detected by the process of the step S108 or this step (S114) in the period (k–1), and outputs it to the target displaying part 28.

The target determination part 24 generates a target display control signal which effects the function display of S112 with respect to a target which is detected as coming into the range of angle in the direction of movement of the pointer in the new period k (including a target coming in of angle θ in the direction of movement of the pointer in successive periods k, k–1) and outputs it to the target displaying part 28.

In step 116 (S116), the target determination part 24 measures the elapsed time t continuously elapsed since the moving distance 1 per a given time exceeds the distance threshold R.

In step 118 (S118), the target determination part 24 compares the elapsed time t with a predetermined time threshold T (3 seconds, for example. may be adjustable by the user) and determines that the function has been displayed for a sufficient length of time for the user to recognize the function display when the elapsed time t exceeds the time threshold T and proceeds to the process of S120. Otherwise, it proceeds to the process of S100.

In step 120 (S120), the target determination part 24 generates a target display control signal to terminate the function display and outputs it to the target displaying part 28.

In step 122 (S122), the target displaying part 28 generates target picture information which initiates or terminates display of target function according to the content of the target display control signal which is generated in the process of S112, S114 and S120 and outputs it to the picture generating part 30.

The picture generating part 30 displays the function for the target according to the target picture information inputted from the target displaying part 28.

As described in the above, the operability of GUI is greatly improved according to the operation picture displaying method shown as the first embodiment of this invention because the icon/window which is targeted by the user is predicted and the function is displayed before the user actually moves the pointer to the icon/window.

Incidentally, the process may be modified so as to generate a target display control signal and/or a pointer display control signal which causes the target determination part 24 to modify the display content such as the color of the detected target or the pointer when the target is detected by the process of S108 or S114 shown in FIG. 4.

Also, the target determination part 24 need not necessarily generate a target display control signal for displaying a function in the proximity of the detected target in the process of S112. The process of the target determination part 24 may be so modified for example as to generate a pointer display control signal for displaying a function which is displayed when the detected target is clicked by the right button of a mouse in the proximity of the pointer for output to the pointer displaying part 26, or to generate a target display control signal for displaying a function which is specified when the detected target is clicked by the right button of a mouse within a predetermined function displaying window for output to the target displaying part 28.

The Second Embodiment

Described hereunder is an operation picture displaying method of the second embodiment of this invention which is implemented by modifying the operation of the GUI software 2 shown in FIG. 3 for predicting a target icon/window to which the user is moving the pointer based on the distance between the pointer and an icon/window and the moving speed v of the pointer.

In order to simplify and clarify the description, a case where the user is pointing the pointer on a window frame is explained.

FIGS. 6A and 6B are diagrams showing the operation picture displaying method of the second embodiment of this invention. FIG. 6A is a diagram showing the frame of a window and the range of the distance L while FIG. 6B is a diagram showing the range of the distance L of the window and the state of the pointer picture control corresponded each other.

FIG. 7 is a diagram showing how the state of the level of the pointer varies depending on the distance from the frame of the window and the moving speed v of the pointer in the operation picture displaying method shown in FIG. 6.

Figure 8A:
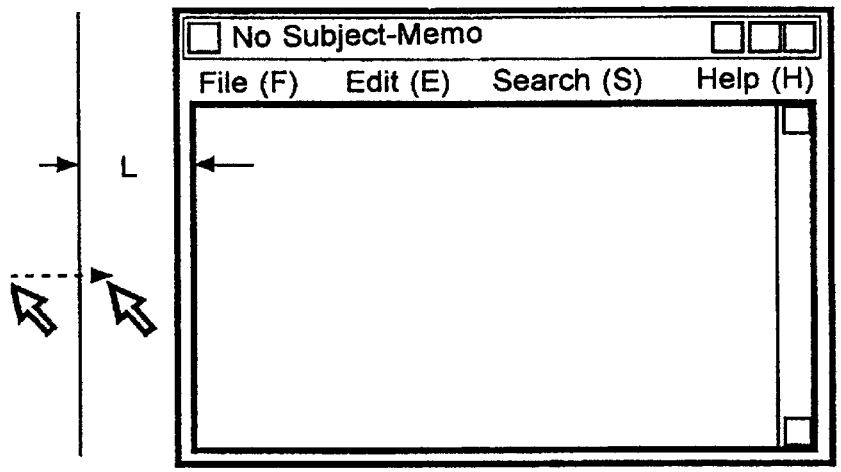
FIGS. 8A, 8B and 8C are diagrams showing how the pointer picture changes in the operation picture displaying method shown in FIG. 6.
Figure 8B:
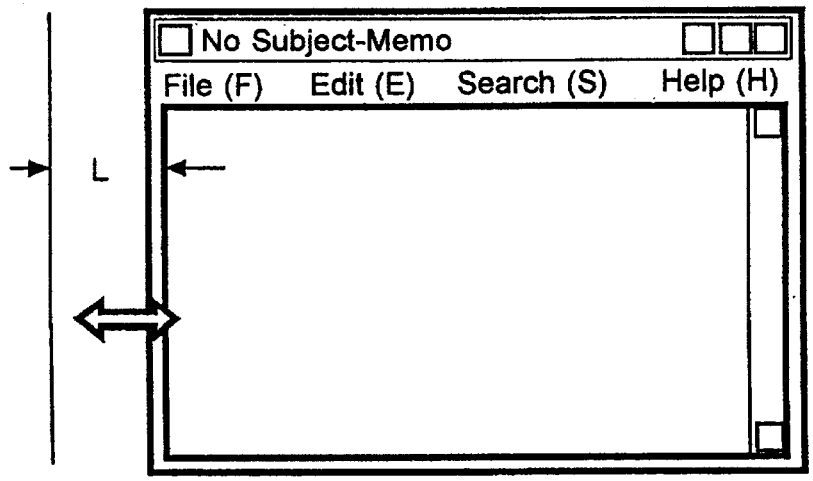
Figure 8C:
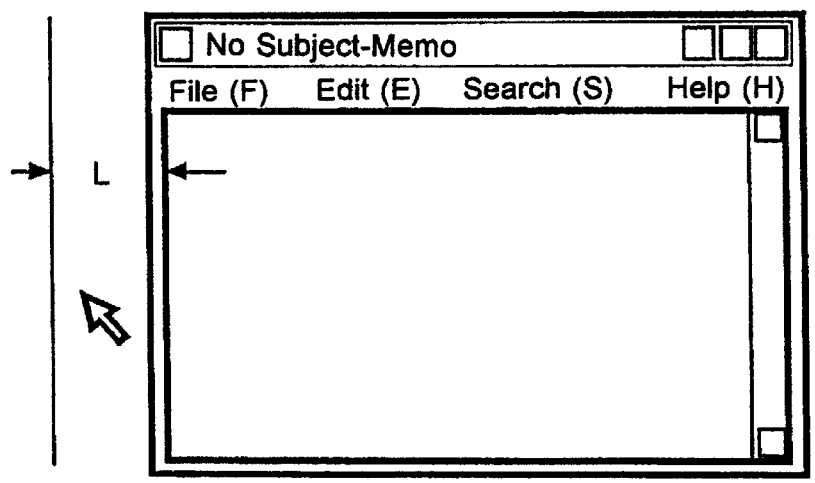

FIGS. 8A–8C are the first to the third diagrams showing how the pointer picture changes in the operation picture displaying method shown in FIG. 6.

In the operation picture displaying method of the second embodiment of this invention, the display screen of the display device 16 is divided into 3 areas including the area of the frame of the window w, the area within the range of the distance threshold L ($L=(X^2+y^2)$, L=20, for example. but may be adjusted by the user) from the frame, and the area of other range as shown in FIG. 6A.

While the frame of the window is separated into a plurality of targets including an area T1 which the user points for modifying the window horizontally, an area T2 which the user points for modifying both horizontally and vertically, and an area T3 which the user point for modifying vertically as shown in FIG. 6A, the frame is treated as a single target T in the following description unless specifically mentioned.

Further as shown in FIG. 6B, 3 pointer levels (base level, level 1, and level 2) are setup to decide the content of display of the pointer depending on in which of the 3 areas shown in FIG. 6A the pointer is and depending on the moving speed of the pointer.

When the pointer comes in the range of distance L from the frame of the window from the state a in FIG. 7 in which the pointer is outside the range of distance L from the frame of the window at a slow moving speed v (0<v<V, V is a predetermined speed threshold which is 50 picture elements per second. However, this may be adjusted by the user depending on the resolution of the display device) as shown by the state b in FIG. 7, the GUI software 2 predicts that the user is now under a precise operation to point the frame of the window using the pointing device 142.

Further, the GUI software 2 changes the state of the pointer from the base level to the level 1 based on this prediction to change the content of display of the pointer from the normal unidirectional arrow head (normal mode) to the bidirectional arrow head appearing in changing the size of the window (size change mode) as shown in the state c in FIG. 7 or in FIG. 8B.

Also, when a given time has elapsed in the state in which the pointer is within the range of distance L from the frame of the window, The GUI software 2 predicts that the user does not intend to select the frame T of the window and changes the pointer which is once placed in the level 1 as shown as the state b and c in FIG. 7 to the base level as shown as the state d in FIG. 7. The GUI software 2 then further changes the pointer which is placed in the size change mode as shown as the state c in FIG. 7 to the pointer of the original normal mode as shown as the state d in FIG. 7 or in FIG. 8C.

The process of restoring the pointer in the state of level 1 to the base level as the time elapses may be also referred to as "upper_force" in the sense that the level is pulled up.

When the pointer comes in the range of distance L from the frame T of the window as shown as the state e in FIG. 7 at the moving speed faster than the speed threshold V from the state outside the range of distance L from the frame of the window as shown as the state a in FIG. 7, the GUI software 2 predicts that the user does not intend to select the frame T of the window using the pointing device 142.

The GUI software 2 further leaves the state of the pointer in the base level based on the prediction and keeps the pointer in a display content of the normal mode in the manner similar to the conventional GUI.

When the user moves the pointer to the frame T of the window and stops it there as shown as the state f in FIG. 7, the GUI software 2 places the state of the pointer in the level 2 and change display of the pointer to the size change mode.

When the frame T is divided into T1–T3 or multiple icons/windows are displayed on the display screen of the display device 16, it should be understood that the GUI software 2 detects the distance between the pointer and each of the frames T1–T3 or each of the icons/windows and effects processing so far described on the frame or the icon/window which is within the distance threshold L from the pointer.

Operation of Computer 1 (GUI Software 2) in the Second Embodiment

The operation of the computer 1 in the second embodiment is now described hereunder.

Figure 9:
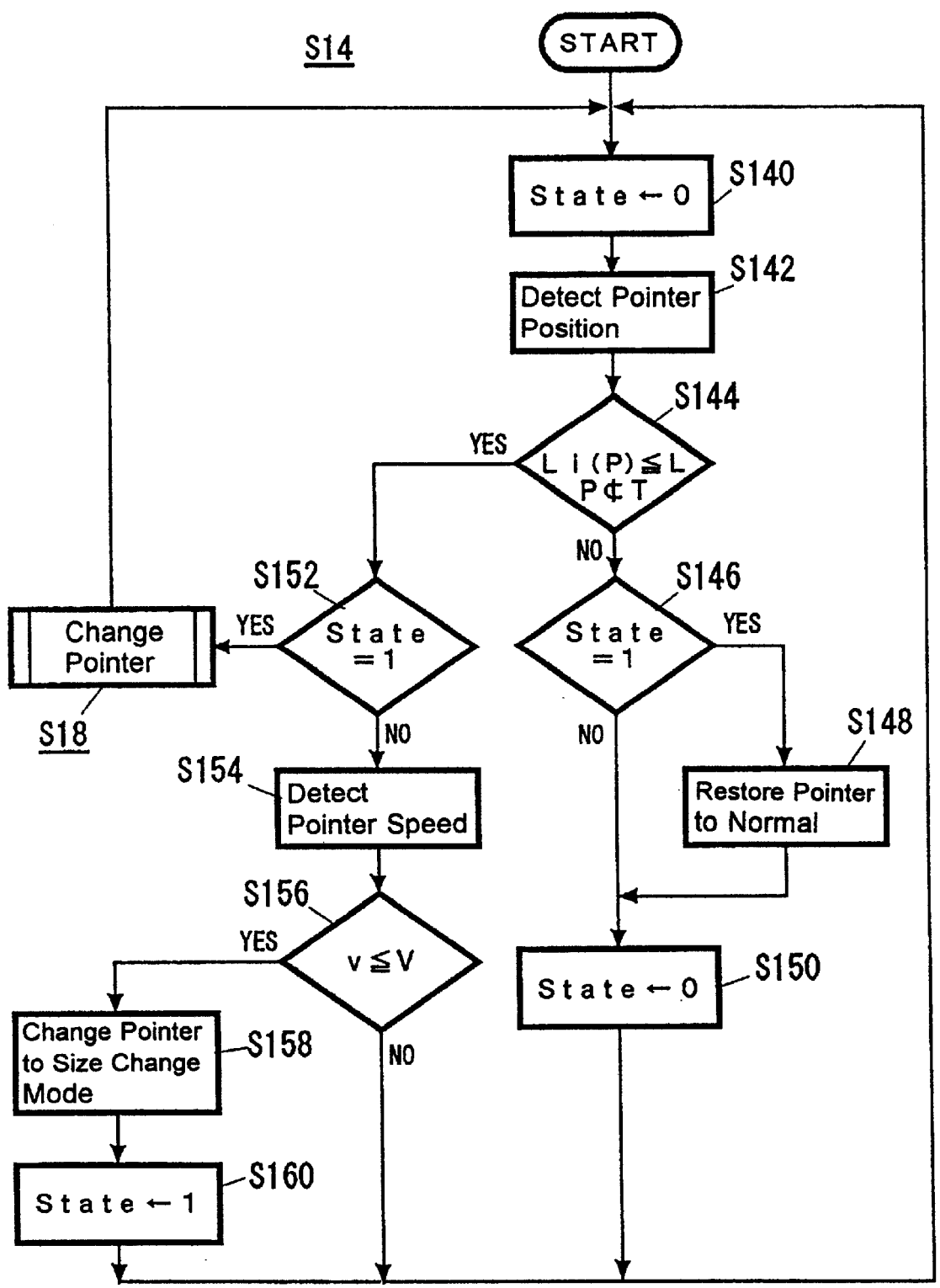
FIG. 9 is a flow chart showing the operation (S14) of the computer 1 (GUI software 2) in the second embodiment.

FIG. 9 is a flow chart showing the operation (S14) of the computer 1 (GUI software 2) in the second embodiment.

Figure 10:
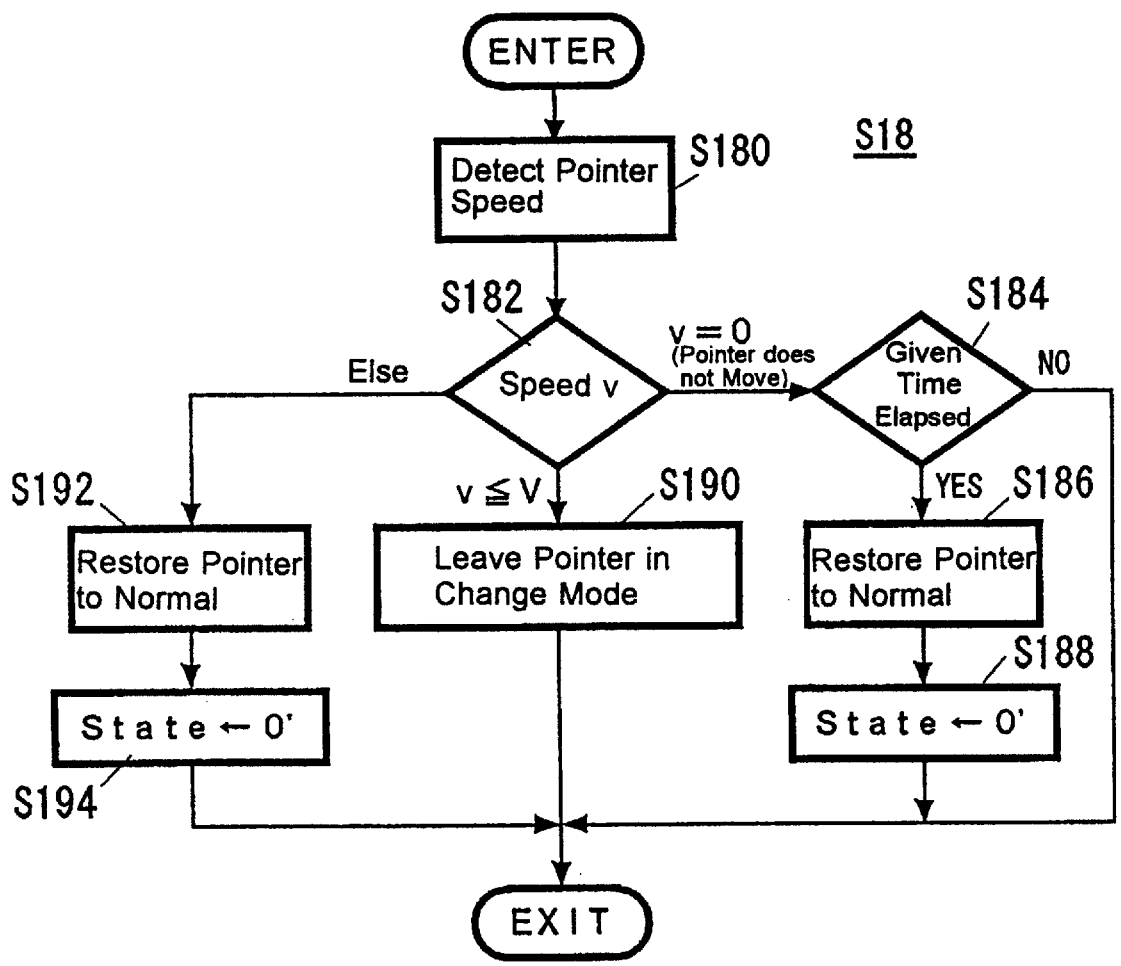
FIG. 10 is a flow chart showing pointer change process (S18) shown in FIG. 9.

FIG. 10 is a flow chart showing pointer change process (S18) shown in FIG. 9.

As shown in FIG. 9, in step 140 (S140), the target determination part 24 of the GUI software 2 (FIG. 3) initializes the value of variable "state" to 0. The variable "state" is a flag indicating the state of the pointer and does not coincide the level described in the above with reference to FIG. 6B and the like The flag assumes an initial value 0, a value 1 when the pointer is in the state of level 1 and a value 0' when it returns from the level 1 to the base level.

In step 142 (S142), the pointing device control part 20 detects the position of the pointer based on the operation input information and outputs it to the pointing device control part 20 as pointer position information.

In step 144 (S144), the target determination part 24 detects the distance Li (p) between the pointer and each of the icons/windows (the frame T of a window is explained hereunder as an example in conformance to the examples so fa used) displayed on the display screen of the display device 16 and determines whether or not there is any frame T which is within the distance threshold L from the pointer without including the display position of the pointer. The target determination part 24 proceeds to the process of S152 when such frame T exists while it proceeds to the process of S146 otherwise. When multiple frames T (icon/window) satisfying this condition exist, the target determination part 24 selects the frame T which is the shortest in distance from the pointer, for example.

In step 146 (S146), the target determination part 24 determines whether or not the value of the variable "state" is 1, i.e., whether or not the state of the pointer is in the level 1. The target determination part 24 proceeds to the process of S150 when the pointer is not in the level 1 while it proceeds to the process of S148 otherwise.

In step 148 (S148), the target determination part 24 predicts that the user does not intend to point the frame T by determining that the user moved the pointer beyond the distance exceeding the distance threshold L from the frame T in the process of S144, generates a pointer display control signal which causes the pointer to return to the normal mode display and outputs it to the pointer displaying part 26.

The pointer displaying part 26 generates a pointer picture which displays a pointer of the normal mode in the position indicated by the pointer position information according to the pointer display control signal inputted from the target determination part 24 and outputs it to the picture generating part 30.

The picture generating part 30 displays the pointer picture inputted from the pointer displaying part 26 in the display screen of the display device 16.

In step 150 (S150), the target determination part 24 restores the variable "state" to the initial value 0 to restore the state of the pointer to the base level and returns to the process of S140.

In step 152 (S152), the target determination part 24 determines whether or not the value of the variable "state" is 1, i.e., whether or not the state of the pointer is in the level 1. The target determination part 24 proceeds to the process of S18 (FIG. 10) when the state of the pointer is in the level 1 while it proceeds to the process of S154 otherwise.

In step 154 (S154), the moving speed/direction determination part 22 detects the moving speed v of the pointer based on the movement information inputted from the pointing device control part 20.

In step 156 (S156), the target determination part 24 determines whether or not the moving speed v is no greater than the speed threshold V. The target determination part 24 proceeds to the process of S158 when the moving speed v is no greater than the speed threshold V while it returns to the process of S140 otherwise.

In step 158 (S158), the target determination part 24 generates a pointer display control signal which causes the pointer to be changed to the size change mode and outputs it to the pointer displaying part 26.

The pointer displaying part 26 generates a pointer picture which displays a pointer of the size change mode in the position indicated by the pointer position information according to the pointer display control signal inputted from the target determination part 24 and outputs it to the picture generating part 30.

The picture generating part 30 displays the pointer picture inputted from the pointer displaying part 26 in the display screen of the display device 16.

In step 160 (S160), the target determination part 24 sets the value of the variable "state" to 1 to place the state of the pointer in the level 1 and returns to the process of S140.

When the button of the pointing device 142 (mouse) is clicked in this state to effect an operation on the mouse to move the pointer, the target determination part 24 outputs to the OS and the like operation output information indicating that an operation is effected to change the size of the window in the manner similar to the case in which the frame T is pointed and an operation is effected to move the pointer in a conventional GUI where the picture displaying method of this invention is not used.

As shown in FIG. 10, in step 180 (S180) of the pointer changing process S18, the moving speed/direction determination part 22 detects the moving speed v of the pointer in the manner similar to S154 (FIG. 9) and outputs it to the target determination part 24 as speed/direction information.

In step 182 (S182), the target determination part 24 determines whether or not the moving speed of the pointer v is 0 (pointer does not move), no greater than the speed threshold V or else. The target determination part 24 proceeds to the process of S184 when the moving speed v is 0, to the process of S190 when the moving speed v is no greater than the speed threshold V and to the process of S192 otherwise (else).

In step 184 (S184), the target determination part 24 determines whether or not a predetermined time has elapsed since the pointer stopped. The target determination part 24 proceeds to the process of S186 when the predetermined time has elapsed while it returns to the process of S140 otherwise.

In step 186 (S186), the target determination part 24 generates a pointer display control signal which causes the pointer to return to the normal mode and outputs it to the pointer displaying part 26.

The pointer displaying part 26 generates pointer picture information according to the pointer control signal inputted from the target determination part 24 while the picture generating part 30 displays a pointer of the normal mode in the display screen of the display device 16 based on the pointer picture information inputted from the pointer displaying part 26.

In step 186 (S186), the target determination part 24 sets the value of the variable "state" to 0' and returns to the process of S140.

In step 190 (S190), the target determination part 24 leaves the display mode of the pointer in the change mode without changing the display mode and returns to the process of S140.

In step 192 (S192), the target determination part 24 restores the pointer to the normal mode.

In step 194 (S194), the target determination part 24 sets the value of the variable "state" to 0' and returns to the process of S140.

As described in the above, according to the operation picture displaying apparatus shown as the second embodiment of this invention, the operability of the GUI is improved because it can precisely predict to which icon/window the user is effecting an operation to target based on the operation which the user effected on the pointing device.

Also, according to the method shown as the second embodiment, a fine operation such as pointing the frame of the window can be done easily.

Figure 11:
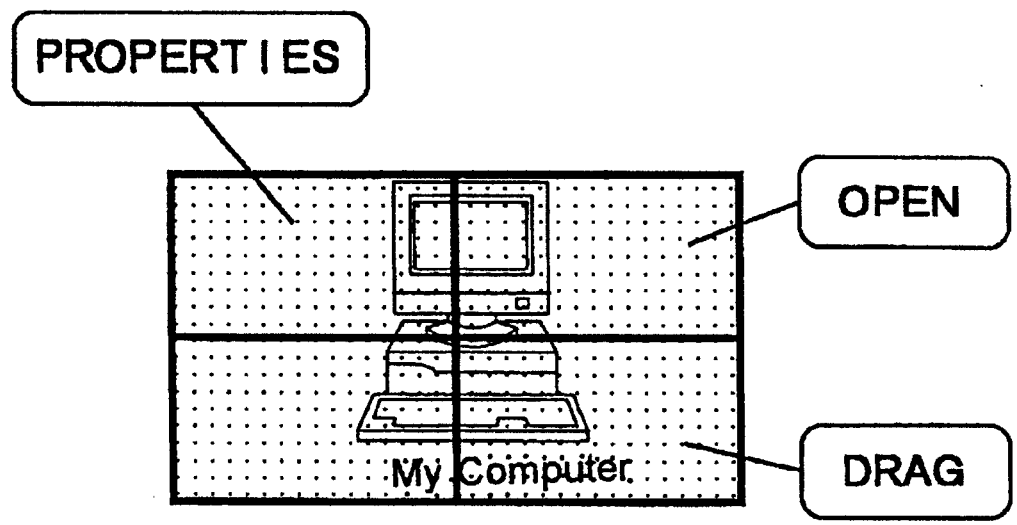
FIG. 11 is a diagram showing an icon which is correlated to different functions for different areas.

FIG. 11 is a diagram showing an icon which is correlated to different functions for different areas.

While an operation to point the frame of the window has been described as a specific example in the above, the method shown as the second embodiment may be applied to another use such as a case where functions are selected for different icon areas as shown in FIG. 11 when the icon areas are correlated to setting a property, opening a file and moving the icon (drag).

Figure 12:
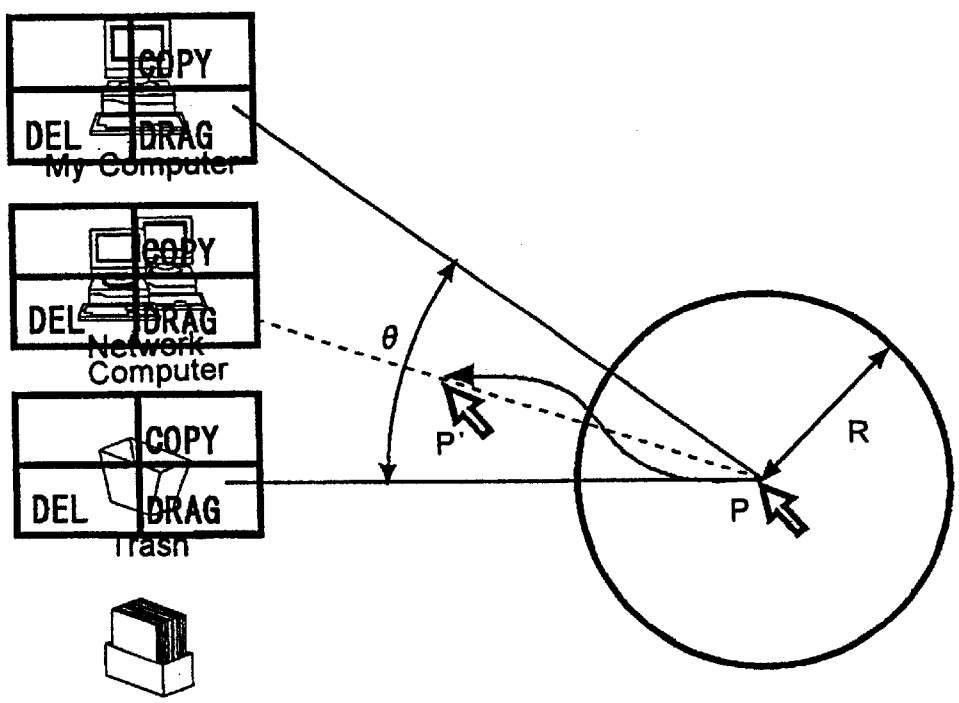
FIG. 12 is a diagram showing a combination of the methods shown in the first and the second embodiments.

FIG. 12 is a diagram showing a combination of the methods shown in the first and the second embodiments.

By combining the methods shown in the first and the second embodiments as shown in FIG. 12, the operability of the GUI is further improved. For example, when it is predicted that the user is moving the pointer targeting the icon shown in FIG. 11, an opaque icon indicating a function associated with a target icon is displayed in superposition with the target icon according to the method shown in the first embodiment to make functions selectable according to the method shown in the second embodiment at the time when the pointer sufficiently approaches the icon.

Effect of the Invention

As described in the above, according to the operation picture displaying apparatus and the method thereof, the operability of GUI is improved by making the operation in doing a precise work such as pointing the frame of an icon (window) easy without sacrificing other operability.

Also, according to the operation picture displaying apparatus and the method thereof, the operability of GUI is improved by precisely predicting an icon (window) to be selected by a user in response to the operation of a pointing device.

Also, according to the operation picture displaying apparatus and the method thereof, the operability of GUI is improved by precisely predicting an icon (window) to be selected by a user so as allow an operation to be effected to a part of an area of the icon (window) according to the prediction.

Also, according to the operation picture displaying apparatus and the method thereof, an icon (window) to be selected by a user is precisely predicted to assist users operation by correctly displaying the function of the icon (window) according to the prediction.

What is claimed is:

1. An operation picture displaying apparatus, comprising:
   operation picture displaying means for displaying two or more operation pictures on a display screen, each of said operation pictures being correlated to an operation of a computer;
   pointer picture displaying means for displaying a pointer at a pointed position on said display screen in response to an external input pointing to an arbitrary position on said display screen;

moving direction/speed detecting means for detecting the direction and the speed of movement of said pointer on said display screen; and operation picture selecting means for automatically selecting one of said operation pictures displayed on said display screen based on said detected moving direction and moving speed before the pointer reaches said selected operation picture.

2. An operation picture displaying apparatus as in claim 1 in which said picture selecting means selects only said operation picture displayed in the direction of movement of said pointer when the moving speed of said pointer exceeds a predetermined threshold speed.

3. An operation picture displaying apparatus as in claim 2 in which said picture selecting means cancels the selection of said selected operation picture when the moving speed of said pointer is below the predetermined threshold speed for longer than a predetermined threshold time.

4. An operation picture displaying apparatus as in claim 3 further comprising operation content displaying means for displaying a content of said operation correlated to said selected operation picture on said display screen.

5. An operation picture displaying apparatus comprising:

operation picture displaying means for displaying two or more operation pictures on a display screen, each of said operation pictures being correlated to an operation of a computer;

pointer picture displaying means for displaying a pointer at a pointed position on said display screen in response to an external operation pointing to an arbitrary position on said display screen;

moving speed/distance detecting means for detecting a moving speed of said pointer on said display screen and a pointer distance between said pointer and each of said operation pictures displayed on said display screen; and operation picture selecting means for automatically selecting one of said operation pictures displayed on said display screen based on said detected moving speed and said pointer distance before the pointer reaches said selected operation picture.

6. An operation picture displaying apparatus as in claim 5 in which said operation picture selecting means selects one of said operation pictures which is within a predetermined distance range from said pointer only when said detected pointer distance is within said predetermined distance range and said detected moving speed is within a predetermined speed range.

7. An operation picture displaying apparatus as in claim 6 in which said operation picture selecting means cancels selection of said selected operation picture when said detected pointer distance is within said predetermined distance range and said detected moving speed exceeds an upper limit of said predetermined speed range or is below a lower limit of said predetermined speed range for longer than a predetermined threshold time, or when said detected pointer distance is outside said predetermined distance range.

8. An operation picture displaying apparatus as in claim 7 and further comprising pointer picture modifying means for modifying the picture of said displayed pointer in response to said operation correlated to said selected operation picture.

9. An operation picture displaying apparatus as in claim 7 and further comprising operation input means for inputting to said computer said operation correlated to said selected operation picture in response to an exterior input.

10. An operation picture displaying method, comprising the steps of:

displaying two or more operation pictures on a display screen, each of said operation pictures being correlated to an operation on a computer;

displaying a pointer at a pointed position on said display screen in response to an external input;

detecting a moving direction and a moving speed of said pointer on said display screen or a moving speed of said pointer on said display screen and a pointer distance between said pointer and each of said operation pictures displayed on said display screen; and automatically selecting one of said operation pictures displayed on said display screen based on said detected moving speed and either said moving direction or said pointer distances before the pointer reaches said selected operation picture.

11. A computer readable recording medium storing a program which causes a computer to execute:

an operation picture displaying step of displaying on a computer screen two or more operation pictures each of which is correlated to an operation on a computer;

a pointer picture displaying step for displaying a pointer at a pointed position on said display screen in response to an external operation pointing to an arbitrary position on said display screen;

a moving direction/speed detecting step for detecting a moving direction and a moving speed of said pointer on said display screen; and an operation picture selecting step for automatically selecting one of said operation pictures displayed on said display screen based on said detected moving direction and moving speed before the pointer reaches said selected operation picture.

12. A computer readable recording medium as in claim 11 in which only said operation picture displayed in the direction of movement of said pointer is selected in said operation picture selecting step when the moving speed of said pointer exceeds a predetermined threshold speed.

13. A computer readable recording medium as in claim 12 in which the selection of said selected operation picture in said picture selecting step is cancelled when the duration in which the moving speed of said pointer is below the predetermined threshold speed lasts longer than a predetermined threshold time.

14. A computer readable recording medium as in claim 13 and further comprising a operation content displaying step for displaying a content of said operation correlated to said selected operation picture on said display screen.

15. A computer readable recording medium storing a program which causes a computer to execute:

an operation picture displaying step of displaying two or more operation pictures on a display screen, each of which is correlated to an operation of a computer;

a pointer picture displaying step of displaying a pointer at a pointed position on said display screen in response to an external operation pointing to an arbitrary position on said display screen;

a moving speed/distance detecting step of detecting a moving speed of said pointer on said display screen and a pointer distance between said pointer and each of said operation pictures displayed on said display screen; and an operation picture selecting step for automatically selecting one of said operation pictures displayed on said display screen based on said detected moving speed and pointer distances before the pointer reaches said selected operation picture.

16. A computer readable recording medium as in claim 15 in which one of said operation pictures which is within a predetermined distance range from said pointer is selected in said operation picture selecting step only when said detected pointer distance is within said predetermined distance range and said detected moving speed is within a predetermined speed range.

17. A computer readable recording medium as in claim 16 in which selection of said selected operation picture in said operation picture selecting step is cancelled when said detected pointer distance is within said predetermined distance range and said detected moving speed exceeds an upper limit of said predetermined speed range or is below a lower limit of said predetermined speed range for longer than a predetermined threshold time, or when said detected pointer distance is outside said predetermined distance range.

18. A computer readable recording medium as in claim 17 and further comprising a pointer picture modifying step for modifying a picture of said displayed pointer in response to said operation correlated to said selected operation picture.

19. A computer readable recording medium as in claim 17 and further comprising an operation input step for inputting said operation correlated to said selected operation picture to said computer in response to an external input.

* * * * *